Patented Jan. 31, 1950

2,495,762

UNITED STATES PATENT OFFICE 2,495,762

ENAMELED ARTICLE

Frank R. Porter, Crown Point, Ind., assignor, by mesne assignments, to George N. Hibben, Chicago, Ill., as trustee No Drawing. Application June 4, 1945, Serial No. 597,603

4 Claims. (Cl. 117—53)

My invention relates to light-colored vitreous or porcelain enameled wares or articles of killed steel and to the process of manufacturing the same.

It has been the practice, in order to obtain on a steel or iron article or part a smooth uniformly adhering covering of light-colored porcelain or vitreous enamel free from defects, to apply and fuse a dark-colored ground or base coat, and then apply and separately fuse the finishing or "cover" coat or coats of the light-colored enamel. By "light-colored," I mean white or pastel shades.

It has been fairly well established that the blistering, pitting and black-specking of light-colored enamel coating on plain carbon steel is due to gaseous carbon products formed and released at enameling temperatures. These products are the result of the reaction of the carbon in the steel with oxides in the enamel or with the hydrogen liberated at enameling temperatures from moisture in the enamel. The carbon present in plain carbon steel is mainly in the form of carbide, which is relatively unstable and readily releases its carbon or reacts with hydrogen, for example, to form methane—a gas.

Fish-scaling in enamels is caused by the escape of hydrogen from the enameled metal on cooling from enameling temperatures to room temperature. At enameling temperature, hydrogen is released from the moisture in the enamel applied directly to a plain carbon steel and part or all of this hydrogen is dissolved in the steel at this elevated temperature, the solubility being greater at elevated than at room temperature. Therefore, as the enameled metal cools, there is a super-saturation of hydrogen and the hydrogen is released from the solution with the result that it builds up enormous pressures which force the enamel off the steel in small fish-scale shaped pieces.

Heretofore the ground coat has been first applied and fused to the steel to overcome these difficulties. The coat is dark or blue-black in color and is usually fused at temperatures ranging from 1580° to 1600° F. The dark color is due to the presence of the most active "adherence-promoting oxides" (cobalt, nickel and manganese oxides) in the enamel. These oxides in this cobalt-type of ground coat have for their purpose to promote adherence of the enamel to the steel. The cover coats, that is, the second and succeeding coats, are separately fused at 1500° to 1520° F. They may be of any desired color, but most of the two and three coat wares or articles, such for example as parts of stoves and refrigerators, are finished in white or pastel shades.

It is our belief—as well as that of others, substantiated by results of numerous experiments—that the adherence of vitreous enamel to steel is accomplished through an iron oxide layer or film formed on the steel surface and under the enamel coating. Apparently the iron oxide dissolves in both the steel and enamel at enamel fusing temperatures. This iron oxide may begin to form as soon as the enamel is applied directly to the steel surface, due to the moisture in the enamel. However, the quantity of iron oxide so formed on plain carbon steel is not sufficient for satisfactory uniform adherence. Cobalt (as well as nickel and manganese) oxide has long been known to promote porcelain enamel adherence and it is believed that this property is due to its relative unstability, i. e., it releases its oxygen comparatively easily, particularly at enameling temperatures, and in contact with some element or compound which will unite with oxygen to form a more stable oxide, which in this case is iron. When the cobalt has given up its oxygen to the steel at enamel fusing temperatures, it then combines with oxygen from the atmosphere and is then ready again to furnish oxygen to the steel. It is therefore an oxygen carrier, actually performing as a catalyst.

The ground coat therefore has more uniform adherence to the steel than would a light-colored enamel applied directly to the steel surface. Hence, the ground coat better traps any hydrogen and better resists the tendency of the pressure of the hydrogen to force the ground coat and the superimposed light-colored enamel coat or coats off the steel in small scale-shaped pieces. However, even with the ground coat, this matter of fish-scaling is a serious problem to manufacturers of enameled articles because the ground coat does not fully insure against fish-scaling, particularly when the quantity of hydrogen reaches a critical stage.

For the past twenty years or more various efforts have been made and much work done, particularly by ceramic engineers and others skilled in the porcelain or vitreous enamel art, with the object in view of obtaining a light-colored porcelain enamel covering on a steel article, which would be free of blisters, black specks, pin-holes and fish-scaling, without using the dark-colored ground coat.

The principal object of my invention is to attain this end. Broadly speaking, I accomplish this object by first alloying the steel with zirconium, columbium or vanadium in a sufficient quantity to stabilize the carbon present in the steel and to combine with the free hydrogen released during the fusing operation, and then after rolling the killed steel into strips, sheets or plates, forming the articles therefrom, and cleaning the article, applying directly to the metal surface of the article (which for some enamels may be the surface of the steel itself or for other enamels is such surface with a nickel film) a coating of light-colored enamel containing a light-colored adherence-promoting oxide such as the oxides of molybdenum, antimony or arsenic incorporated in the frit, the coating being fused directly to the surface at suitable temperature, thus eliminating the usual ground coat with improved results. If an adequate amount of the alloying metal is present to accomplish the above, the steel will show no yield point during a tensile test, which test is easily made as is well known in the art. Such test showing no yield point demonstrates a sufficiency of the alloying metal.

I probably can best describe my invention in detail by explaining how I have actually produced light-colored enameled articles in accordance with my invention and determined certain limits and factors.

I have found by experiment and tests that the proportion or ratio of zirconium to carbon in the steel is to be not less than 7 parts of zirconium for each part of carbon. The atomic ratio of zirconium to carbon should be at least .9 to 1. The maximum ratio for all practical purposes may be 15 parts of zirconium for each part of carbon. In connection with these experiments I have made steels having different analyses. One of the steels, in which the ratio of zirconium to carbon was approximately 7.7 to 1, had the following analysis by percentages:

| | |
|---|---|
| Carbon | .06 |
| Manganese | .41 |
| Sulphur | .015 |
| Phosphorus | .013 |
| Silicon | .91 |
| Aluminum | .06 |
| Zirconium | .46 |
| Iron (by difference) | 98.072 |

The composition and percentages may be varied but the carbon should not be in excess of about 0.15%.

Specimens of this steel were hot rolled to plates ¼" thick and samples obtained for enameling. The specimens were somewhat severely pickled, dried and then enameled with a commercial white enamel. The white enamel was prepared by taking a commercial frit, containing as one of its ingredients 6.45% of antimony oxide ($Sb_2O_5$) and milling 3400 grams of the frit with 238 grams of enameler's clay, 68 grams of a commercial opacifier (comprising $ZrO_2$, $SiO_2$, calcium, magnesium, sodium, and potassium), 4.25 grams of sodium nitrite and 1400 cubic centimeters of distilled water. The other ingredients (besides $Sb_2O_5$) of the frit and the percentages thereof were as follows: $SiO_2$ 42.22, $Al_2O_3$ 1.80, $AlF_3$ 10.00, $CaF_2$ 7.15, ZnO 3.15, $Na_2O$ 12.11, $K_2O$ 2.35 and $B_2O_3$ 14.48. The 6.45% of antimony oxide ($Sb_2O_5$) functions as the adherence promoting oxide. The enamel was applied to the clean steel surface by spraying, the thickness of the sprayed coating varying from .006" to .010" in thickness. The sprayed enamel was dried and then fired for approximately six minutes at approximately 1560° F. The product resulting from this process, just described, was free of blisters, black-specks, pinholes and fish-scaling and the enamel had an excellent bond, that is, a high degree of adherence to the steel surface. The product was at least equal in quality to the best comparable white enameled ware on the market.

Commercial white molybdenum trioxide enamels may also be used in place of the white antimony enamels. So may arsenic enamels. Such enamels are active oxygen carriers and the oxides are quite unstable. Such enamels may be said to be of the antimony type.

Zirconium or titanium enamels, when applied directly to the steel surface do not produce such a satisfactory bond as do the enamels of the antimony type. The zirconium and titanium enamels are not quite so active as oxygen carriers. Such enamels may be said to be of the zirconium type. Their oxides are not as unstable as those of the antimony type. In order to obtain a satisfactory bond with enamels of the zirconium and titanium type, I find it desirable to give the metal a nickel film following the pickling and rinsing operations. This nickeling process may consist of immersing the metal in a bath as follows:

| | |
|---|---|
| Single nickel salts ($NiSO_4 \cdot 7H_2O$) | 1½ to 2 oz. |
| Boric acid ($H_3BO_3$) | ¼ oz. |
| Water | 1 gallon |
| Hydrogen ion concentration (pH) | 3–4 |
| Temperature | 160–170° F. |
| Time of immersion | 6 to 10 minutes |

The amount of the nickel deposited should be not less than .09 gram nor more than .20 gram per square foot of surface.

By way of example, one of the zirconium enamels, which I have used, had the following composition by percentages: $SiO_2$ 29.60, MnO .17, $CaF_2$ 9.75, $AlF_3$ 2.75, $Al_2O_3$ 6.71, $Fe_2O_3$ .43, $ZrO_2$ 16.50, MgO .43, $SO_3$ .35, $Na_2O$ 14.76, $K_2O$ 1.24, $B_2O_3$ 15.40, and undetermined portion 1.91.

Apparently, zirconium or titanium oxide is not sufficiently unstable at enameling temperatures to provide a satisfactory bond when the enamel is applied immediately to the steel surface. The nickel deposit between such surface and such enamel affords oxides which are sufficiently unstable to provide a proper bond, when fired at a temperature of about 1520°.

I have found that columbium or vanadium may be used in place of zirconium in the steel. I consider these three metals to be of the same group as they act generally the same, since these three elements are all soluble in iron and form stable carbides.

The minimum and maximum ratios or proportions of columbium to carbon are substantially the same as those when zirconium is used. The composition shown below is of a columbium steel which was made in the course of my experiments and which had a ratio of columbium to carbon of 7.4 to 1.

| | |
|---|---|
| Carbon | .050 |
| Manganese | .280 |
| Phosphorus | .011 |
| Sulphur | .026 |
| Silicon | .040 |
| Aluminum | .011 |
| Columbium | .370 |
| Iron (by difference) | 99.212 |

Again the carbon should not exceed about 0.15%.

This columbium steel, when enameled as explained above in connection with the zirconium steel, gave like satisfactory results.

The minimum ratio or proportion of vanadium to carbon in the steel I have found to be about eight parts of vanadium for each part of carbon. The atomic ratio of vanadium to carbon should be at least 1.8 to 1. The maximum ratio for all practical purposes may be 18 parts of vanadium for each part of carbon. The composition shown below is of a vanadium steel which was made and which had a ratio of vanadium to carbon of 11.7 to 1.

| | |
|---|---|
| Carbon | .10 |
| Manganese | .36 |
| Phosphorus | .012 |
| Sulphur | .032 |
| Silicon | .20 |
| Aluminum | .061 |
| Vanadium | 1.17 |
| Iron (by difference) | 98.065 |

The carbon should not exceed about 0.15%.

This steel enameled entirely satisfactorily with white commercial enamels applied as explained above.

I am of the opinion that my invention affords satisfactory results without the use of the dark-colored ground coat because the alloying metal, that is, zirconium, columbium or vanadium, combines with the carbon present in the steel to form a carbide which is very stable, and the alloying metal also combines with the hydrogen entering into the steel to form a hydride. Thus gaseous carbon products are not released at enameling temperatures and the cause for blistering, pitting and black-specking is eliminated and harmful amounts of free hydrogen are not present and the cause for fish-scaling is eliminated. This is the case when enamels of either the antimony or zirconium type are used. However, in order to obtain satisfactory adherence when an enamel of the zirconium type is employed, the surface of the alloy steel is nickled. The alloyed steel also may be provided with the nickel film when enamels of the antimony type are used.

My invention has decided advantages as I obtain a superior product at considerably less cost. Heretofore it has been necessary to fuse the cobalt-type ground coat at a temperature of approximately 1580° F. whereas the fusing temperature which I may use is lower and thus less sagging and warping of the product occurs during my firing cycle. Also heretofore, the cobalt type ground coat, because of its dark color, required a heavier or thicker light-colored enamel cover, whereas my invention permits a thinner cover of enamel, which is very desirable from an enamel chipping standpoint. Obviously, my process is more economical and my product costs less. The expense of fusing a ground coat at a higher temperature is eliminated. Less enamel is used, not only because the coat or coats are thinner, but because less coats accomplish the end sought.

Reference is made to my copending application Ser. No. 90,049, filed April 27, 1949, as a continuation-in-part of the present application.

I claim:

1. A light-colored enameled steel article comprising: a base of killed steel containing alloyed with it a metal selected from the group consisting of zirconium, vanadium, and columbium, the carbon content of said steel being not in excess of about 0.15% and the weight ratio of alloying metal to carbon present in the steel being from about 8:1 to about 18:1 in the case of vanadium and from about 7:1 to about 15:1 in the case of zirconium and columbium; a nickel deposit on the surface of said base amounting to not less than about .09 gram nor more than about .20 gram per square foot of surface; and a coat of light-colored vitreous enamel applied directly to the nickel coated base and containing as part of the frit a light-colored adherence promoting oxide selected from the group consisting of zirconium oxide and titanium oxide.

2. A light-colored enameled steel article comprising: a base of killed steel containing vanadium alloyed therewith, the carbon content of said steel being not in excess of about 0.15% and the weight ratio of vanadium to carbon present in the steel being from about 8:1 to about 18:1; a nickel deposit on the surface of said base amounting to not less than about .09 gram nor more than about .20 gram per square foot of surface; and a coat of light-colored vitreous enamel applied directly to the nickel coated base and containing as part of the frit a light-colored adherence promoting oxide selected from the group consisting of zirconium oxide and titanium oxide.

3. A light-colored enameled steel article comprising: a base of killed steel containing alloyed with it a metal selected from the group consisting of zirconium, vanadium, and columbium, the carbon content of said steel being not in excess of about 0.15% and the weight ratio of alloying metal to carbon present in the steel being from about 8:1 to about 18:1 in the case of vanadium and from about 7:1 to about 15:1 in the case of zirconium and columbium; a nickel deposit on the surface of said base amounting to not less than about .09 gram nor more than about .20 gram per square foot of surface; and a coat of light-colored vitreous enamel applied directly to the nickel coated base and containing zirconium oxide as part of the frit.

4. A light-colored enameled steel article comprising: a base of killed steel containing alloyed with it a metal selected from the group consisting of zirconium, vanadium, and columbium, the carbon content of said steel being not in excess of about 0.15% and the weight ratio of alloying metal to carbon present in the steel being from about 8:1 to about 18:1 in the case of vanadium and from about 7:1 to about 15:1 in the case of zirconium and columbium; a nickel deposit on the surface of said base amounting to not less than about .09 gram nor more than about .20 gram per square foot of surface; and a coat of light-colored vitreous enamel applied directly to the nickel coated base and containing titanium oxide as part of the frit.

FRANK R. PORTER.

REFERENCES CITED

The following references are of record in the file of this patent:

UNITED STATES PATENTS

| Number | Name | Date |
|---|---|---|
| 875,667 | Manning | Dec. 31, 1907 |
| 1,360,317 | Rieser | Nov. 30, 1920 |
| 2,065,392 | Porter et al. | Dec. 22, 1936 |
| 2,101,950 | McGohan | Dec. 14, 1937 |
| 2,115,855 | Holman | May 3, 1938 |
| 2,137,388 | Canfield et al. | Aug. 16, 1938 |
| 2,264,355 | Becket | Dec. 2, 1941 |
| 2,356,450 | Epstein | Aug. 22, 1944 |
| 2,396,856 | King | Mar. 19, 1946 |
| 2,414,633 | Bryant | Jan. 21, 1947 |